Jan. 20, 1959     A. H. BRUNDAGE     2,869,759
COFFEE MAKING ASSEMBLY
Filed Oct. 17, 1957     2 Sheets-Sheet 1
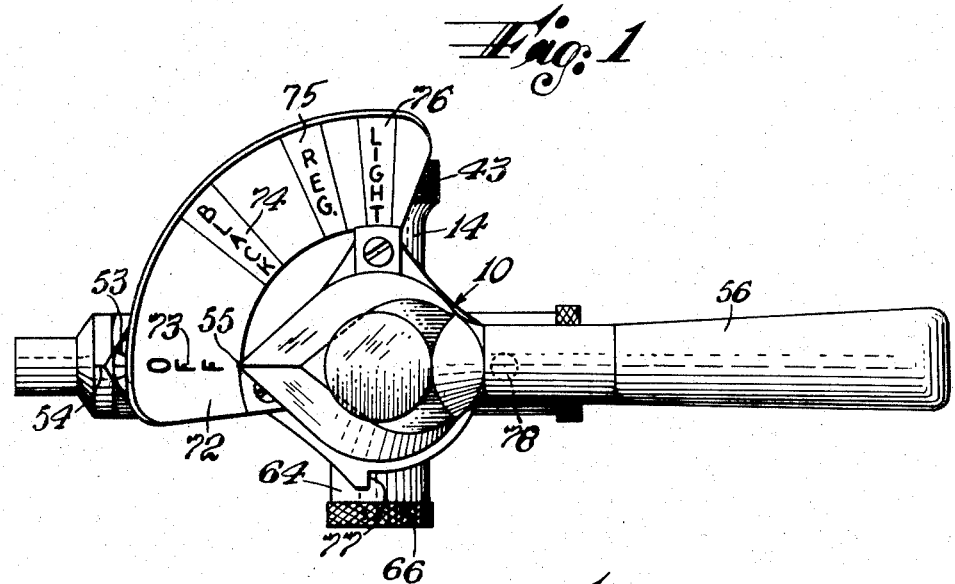
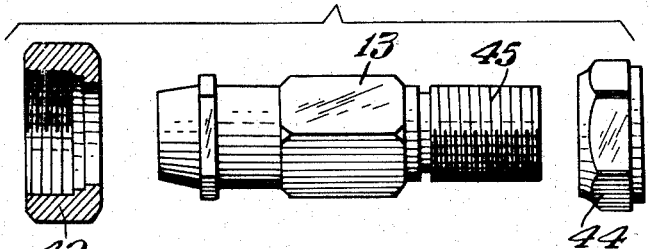
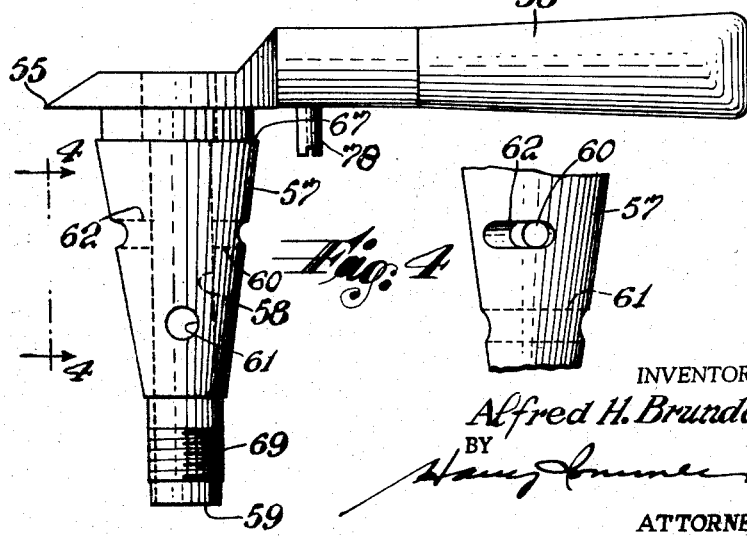
INVENTOR.
Alfred H. Brundage
BY
ATTORNEY Jan. 20, 1959　　　A. H. BRUNDAGE　　　2,869,759
COFFEE MAKING ASSEMBLY
Filed Oct. 17, 1957　　　2 Sheets-Sheet 2
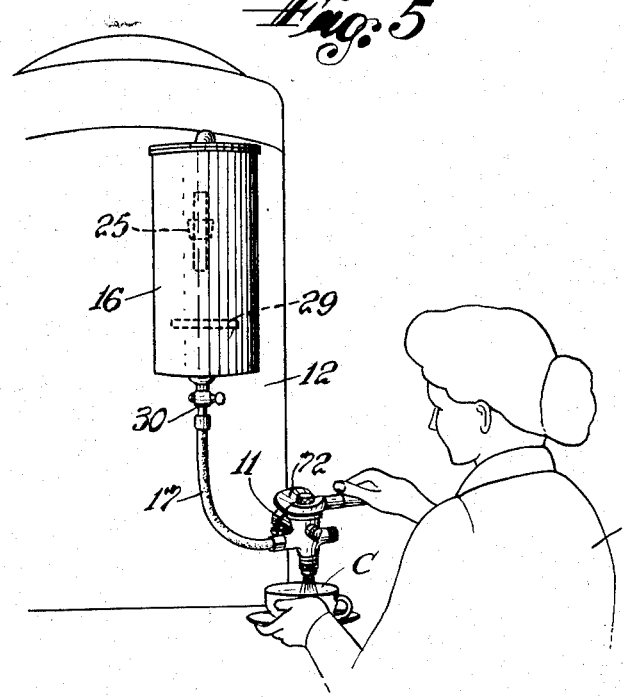
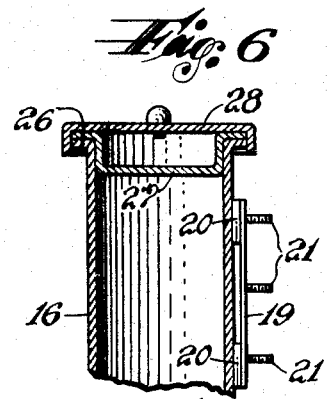
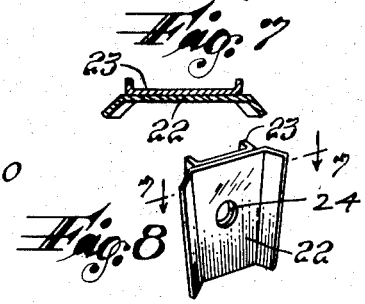
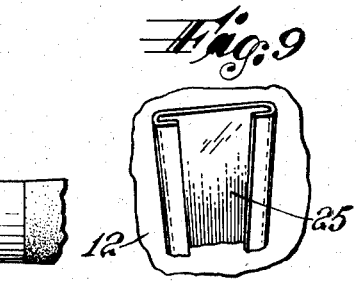
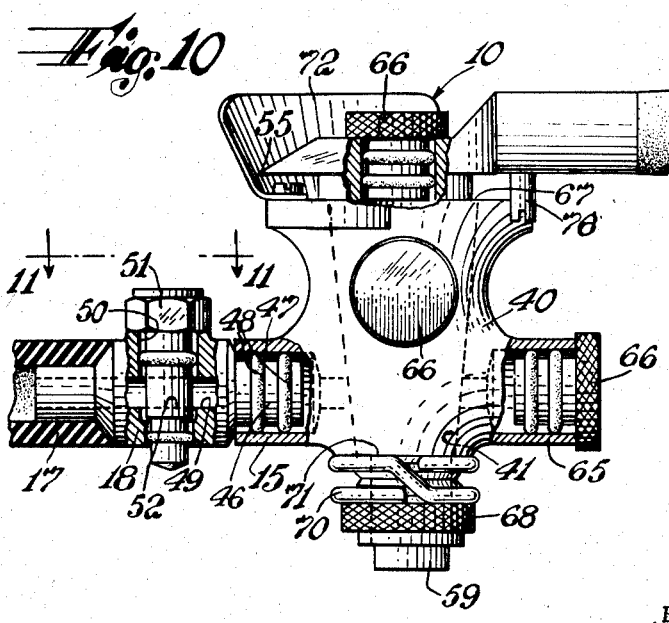
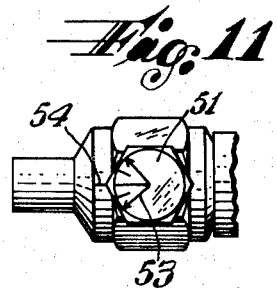
INVENTOR.
Alfred H. Brundage
BY
ATTORNEY

United States Patent Office 2,869,759
Patented Jan. 20, 1959

2,869,759

COFFEE MAKING ASSEMBLY

Alfred H. Brundage, Maplewood, N. J.

Application October 17, 1957, Serial No. 690,813

9 Claims. (Cl. 222—48)

The coffee making assembly of the present invention is designed to meet the special requirements of the "coffee break" custom. The problem of providing a practical coffee break mechanism minimizing disruption of operations is a serious one, particularly where, for example, large numbers of employees must be provided with coffee in a short designated time. In some cases employers sought to provide coffee break facilities in a cafeteria, for example, at a designated location in the plant; the ensuing congestion and crowding resulted in inevitable bottlenecks so that not only was considerably more time required for the coffee break, but there was resultant irritation to all concerned.

The present invention is designed to provide a coffee making assembly which may be made portable so that it may be wheeled directly to the workers in the various floors and locations of plants or other facilities such as Red Cross or armed services and provide rapid and orderly coffee break procedure facilities. An important object of the invention is the provision of novel means for rapidly and accurately selecting the precise relative ratios of coffee-to-cream to suit the individual taste.

The assembly is of rugged but simple construction, with indicia to denote the ratios of coffee-to-cream available, so that self service may be had, each person operating the assembly to precisely suit his individual taste in the coffee-to-cream mixture color.

A further feature of the invention is the provisions of means for setting the flow of cream so as to accommodate the assembly to the particular "cream" composition used. As used herein, the term "cream" shall be deemed to comprehend cream and/or milk and various substitutes and combinations thereof. In some cases, one quart of milk mixed with one small can of evaporated milk are used as "cream"; in others, one quart of milk is mixed with a tall can of evaporated milk. In some cases, ordinary homogenized milk is used as "cream"; in others there is a 15% cream mixture, the balance being milk. Pursuant to the invention, the assembly may be set so as to automatically adjust to the individual "cream" arrangement to be used, thus maintaining a standard of accuracy of dispensing precisely the coffee-cream mixture desired by the individual notwithstanding the particular "cream" composition in use.

The assembly is simple in construction and operation and includes, as a feature thereof, a display plate bearing indicia with which a handle for operating the elongated valve stem of the assembly may be registered. Thus, when the handle is rotated to point to the desired coffee-cream mixture on the indicia plate, the assembly then automatically provides the coffee-cream mixture desired.

The device provides other novel features of construction pursuant to which it may be completely assembled or disassembled manually without the use of any tools and may be cleaned through and through in both directions and the parts thereof separated for soaking in soap and water, thus conforming to the strict requirements of Health Departments for devices for such use. A further feature of the invention is in the provision of an assembly as above set forth, wherein the product zone is completely devoid of any internal threads—a further Health Department requirement. A further feature of the invention is the provision of means for frictionally positioning various parts of the device therein in such manner as to impose a seal, when assembled, while enabling the ready disassembly thereof upon the application of manual pressure without the use of tools. A further feature of the invention consists in the provisions of means for adjusting the assembly for use with a coffee urn and cream container disposed at either the right or left hand side of the coffee urn from the position of the operator. This is an important feature in adapting the assembly to mobile carts, for example, wherein the coffee and cream units are sometimes positioned at the left and sometimes at the right hand ends of such carts.

Examples of practical devices embodying the invention are described below and in the accompanying drawings; the invention is not limited thereto, but covers all other forms coming within the scope or purview of the disclosure herein.

In the drawings:

Fig. 1 is a top plan view of an assembly embodying the invention,

Fig. 2 is an exploded view of typical parts useful for coupling the assembly to a coffee urn outlet, Fig. 3 is a side elevational view of a valve stem adapted to be used in connection with the invention, Fig. 4 is a fragmentary, elevational view thereof, taken on line 4—4 of Fig. 3, Fig. 5 is a fragmentary perspective view of the assembly, shown connected to a coffee urn and cream container, with a fanciful figure shown operating the assembly, Fig. 6 is a fragmentary, vertical, sectional view, showing one of many types of cream container with which the invention may be used, Fig. 7 is a transverse sectional view of a mounting bracket which may be used in connection therewith, Fig. 8 is a vertical, elevational view of said mounting bracket, Fig. 9 is a fragmentary, elevational view of a coffee urn and socket thereon for receiving the bracket of Fig. 8, Fig. 10 is a vertical, fragmentary, sectional view of the assembly, and Fig. 11 is a fragmentary, plan view taken on line 11—11 of Fig. 10.

As shown in the drawings, the assembly 10 (Fig. 1) of the invention is adapted to be used for drawing coffee from a discharge opening 11 (Fig. 5) of a coffee urn 12 to which an arm 14 (Fig. 1) of the assembly may be connected as by a suitable coupling 13 (Fig. 2). The assembly is provided with another arm 15 (Fig. 10) having a cream regulator bracket 18 for adjusting the flow of cream from the container 16 so as to accommodate the assembly to the particular "cream" arrangement used, bracket 18 being adapted to be connected to a cream container such as shown at 16 (Fig. 5) preferably through a pipe 17 or the like. A suitable coupling 30 may connect the pipe 17 with the discharge opening in the lower end of the cream container 16. The cream container 16 (Fig. 6) may be of any suitable form and may be provided with a spacer plate 19 secured to the cream container by spacers 20, plate 19 having threaded studs 21. An anchor plate 22 (Figs. 7 and 8) having a channel 23 rigidly fixed to the rear thereof and an aperture 24 therethrough may be positioned at that particular threaded stud 21 required to properly locate the cream container 16 relative to the assembly 10. Then, by the use of a conventional nut member threaded onto the so selected stud 21, the plate 22 may be secured in the desired position on cream container 16. The coffee urn 12 in turn may be provided with a socket member 25 thereon (Fig. 9) to receive the anchor plate 22 and thus position the cream container 16 at the desired point on the coffee urn 12. A second socket member (not shown) may be provided on the coffee urn 12 and removed from the shown socket member 25, 180° thus providing a pair of socket members, one for mounting the cream container and the other for mounting a stack assembly of paper cups, for example. It will be understood that the construction of cream container described is desirable as providing a space between the cream container and coffee urn and to facilitate the location of the cream container at the desired point along the coffee urn so that various parts may be made in standard units and suited by the user to his particular requirements. It will be apparent that the invention is not limited to the particular construction of coffee urn or cream container described, being adapted to be used with an infinite variety of other forms thereof. The cream container may be mounted at the left or right of the assembly 10, depending upon the requirements of the particular installation, the assembly being adopted thereto as below described.

The cream container shown in Fig. 6 has an open top 26 on which a dish-shaped plate 27 may be positioned and filled with ice; a cover 28 may be provided. A spacer 29 may be secured to and extended from the lower end of the cream container 16 (Fig. 5) to keep the latter spaced from the coffee urn 12.

The assembly of the present invention comprises, as shown in the drawings (Fig. 10) a faucet casing 40 having an axial opening 41 therethrough and having arm members 14 (Fig. 1), 15 extending laterally from the casing, said arm members and casing having aligned openings therethrough, one of the arm members, 14, being adapted to be connected to the coffee urn 12 by suitable means such as the assembly shown at 13, Fig. 2, wherein the nut member 42 would be used to draw the coupling 13 into engagement with the end 43 (Fig. 1) of the arm member 14 and the nut member 44 for connection of the end 45 of the coupling 13 with the discharge opening 11 of the coffee urn 12. It will be understood that an infinite variety of other couplings may be used in lieu of coupling 13 above described for the purpose.

The above mentioned cream regulator bracket 18 (Fig. 10) has a reduced end 46 received in the opening 47 of the arm 15, said reduced end 46 being preferably provided with compressible rings 48 to exert a friction contact with the opening 47 of the arm 15 to vacuum seal the end 46 of the cream regulator bracket in the arm 15, while enabling ready separation, whenever desired, for cleaning, inspection, or replacement. A similar arrangement may be used, as shown in the drawings, for other separable parts of the device. Other manually operable friction means may be used in lieu of said spaced, compressible rings 48, to the same end.

The bracket 18 has an axial opening 49 and has a further opening 50 therethrough perpendicular to the axial opening. A plug 51 is rotatably journaled in the perpendicular opening 50 of bracket 18 and has a transverse opening 52 therethrough in the plane of the axial opening 49 of the bracket when the plug is journaled in the perpendicular opening 50 of the bracket. Thus, on turning the plug in the bracket, the transverse opening 52 of the plug may be selectively moved into partial or full registry with the axial opening 49 of the bracket 18 or out of registry therewith, to thus regulate the flow of cream through the bracket and arm member of the faucet casing to which the bracket is secured. The plug 51 and bracket 18 preferably are provided with complementary indicia means, such as markings 53 atop the plug (Figs. 1 and 11) to be read relative to a reference point 54 marked on the bracket 18, said indicia being visible from the top thereof and oriented relative to the plane of the transverse opening 52 through the plug, to indicate the position of said opening relative to the axial opening of the bracket 49 on turning the plug in the bracket. Thus the volume of flow of "cream" through the plug and bracket, is controlled by rotating plug 51, to compensate for the use of the specific "cream" or milk-cream mixture in the container 16. The user adjusts the plug 51 to regulate the device to the desired cream flow, when the assembly is first installed; it is not necessary to change this adjustment thereafter.

Heretofore coffee making devices commonly in use in restaurants, cafeterias and the like, have been so constructed as always to deliver relatively fixed quantities of the two liquids so as, for example, to deliver a certain quantity of coffee and a lesser quantity of cream or milk in fixed ratio. According to my invention, the relative quantities of the two liquids may be varied as desired. For example, my invention provides for mixing with coffee, any smaller or larger quantity of milk or cream. My invention further provides for accomplishing this ratio desired at all times without altering the maximum flow of the coffee, while the flow of milk or cream may be changed or varied between zero and maximum. By thus controlling the flow of milk or cream relative to coffee, persons may be conveniently served with coffee having a suitable amount of milk or cream therein or having none, or having any intermediate amount, in accordance with their precise and various desires.

The elongated valve stem 57 of the assembly is proportioned to snugly rotatably fit in the axial opening 41 of the faucet casing 40 (Fig. 10). Said valve stem (Fig. 3) has a vertical discharge opening 58 terminating at the lower end 59 of the stem and has axially spaced transverse openings 60, 61 intersecting the vertical opening and terminating circumferentially of the stem, the parts being so proportioned that the valve stem will snugly rotatably fit within the axial opening 41 of the casing 40 and, when so disposed (Fig. 10) has the transverse openings 60, 61 thereof aligned with the planes of the openings in the casing aligned with the transversely extending (coffee-cream) arms 14, 15. Thus, on rotation of the stem in axial opening 41, of the faucet casing, the transverse openings of the stem 60, 61 will be selectively rotated to registry with the arms 14, 15 of the faucet casing, thus mixing coffee-cream in the predetermined desired relative ratios to suit the individual taste. The transverse (coffee) opening 60 of the valve stem aligned with the faucet casing arm to be connected to the coffee urn (such as 14, Fig. 1) on assembly of the stem in the faucet casing, is elongated circumferentially along the outer face of the valve, as noted at 62 (Fig. 4) equidistant the center of the transverse opening 60 in each direction, to continue registry of the stem opening 60 with the casing arm 14 while the other transverse opening 61 of the valve stem is registered with (or past) the arm 15 connected to the cream container, to the degree predetermined by rotation of the valve stem 57. Further arm members 64 (Fig. 1) 65 (Fig. 10) extend laterally of the casing in line with and 180° removed from the arms 14, 15 respectively thereof which are connected to the coffee urn and cream container. Said further arm members 64, 65 and faucet casing have aligned openings therethrough. The further arm member 65 facilitates connection of the cream container 16 to either of the arms 15, 65 (Figs. 5 and 10) depending on the location of container 16, and means are provided, such as a closure cap 66 (Fig. 10) for closing that arm member not to be connected with the cream container. The further arm member 64 aligned with the arm member 14 (Fig. 1) and the further arm member 65 (Fig. 10) aligned with the arm member 15, facilitate cleaning the assembly transversely. To the same end, the vertical discharge opening 58 of valve stem 57 for the faucet casing may terminate at the upper end 67 of the stem (Fig. 3) so that the stem may be axially cleaned. Means removable to facilitate cleaning such as a closure cap 66 (Fig. 10) may be provided to close the vertical discharge opening of the valve stem at the upper end 67 of the latter. Means may be provided engaging the lower end of the valve stem and the casing 40 for frictionally holding the valve stem assembly in the faucet casing, said means may be such as shown in Fig. 10, comprising a nut member 68 threaded onto a threaded portion 69 (Fig. 3) at the lower end of the valve stem 57 compressing a spring 70 (Fig. 10) interposed between the nut member 68 and the lower end 71 of the faucet casing 40.

As above noted, a handle 56 (Figs. 1 and 3) is secured to the stem 57 and provided with a pointer 55, and an indicia plate 72 is secured to the faucet casing 40 in registry with the plane of rotation of the handle, said plate bearing markings such as 73 "off," 74 "black," 75 "regular," or 76 "light" to note the relative ratio of coffee and cream selected. That ratio is attained on turning the valve stem in the faucet casing, thus selecting degree of alignment of the transverse openings 60, 61 of the valve stem with the arms of the faucet casing to be connected with the coffee urn and the cream container. Thus, the operator O (Fig. 5) can conveniently hold the cup C to be filled beneath the discharge end 59 of the assembly (Fig. 10) and, by simple rotation of the handle 56 so that the point 55 thereof will register with the desired marking (74, 75, 76) preselect exactly the relative mixture of coffee and cream thus dispensed. When the cup has been filled, the handle is rotated to the "off" position (73). The markings 74, 75, 76 may be of different colors, if desired, so as to immediately indicate, by color, the "black," "regular" and "light" mixtures obtained by rotating the handle 56 to said (color) markings, without even reading the word indicia provided. The handle 56 may be provided with a top end 78 (Fig. 10) to be registered with stop shoulders or portions 77 (Fig. 1) at the extremes of movement, if desired.

The invention, illustrated in the drawings with reference to a coffee urn 12, may be applied with equal efficacy to a mobile coffee carrier such as used for serving coffee in catastrophe areas, or for military or other mobile purposes. In such cases the coffee is usually brewed in large urns and poured therefrom into the coffee carrier, which is essentially an insulated can, to the coffee discharge opening of which the assembly of the invention may be applied just as it is shown in the drawings applied to urn 12. The cream container 16 would be secured to one side of the can and a unit or battery of cups applied 180° therefrom, securing the cream container and cup unit to socket members 25 secured to anchor plates 22 on the insulated can.

On disengaging the assembly 10 (as in Fig. 1) from the coupling 13, the assembly may be readily submerged in hot water, using soap suds, meeting a further Board of Health requirement. Likewise the cream container 16 may be readily removed from the coffee urn and submerged in hot water, using ample soap suds.

It is found, in practice, that the device of the invention is highly effective for the intended purpose and that the features of construction above noted enable the same to be operated rapidly and safely either by persons especially appointed to dispense coffee, or for self service use of the invention.

I claim:

1. An assembly for drawing coffee and cream from a coffee urn and cream container and for mixing them in predetermined relative ratios, comprising a faucet casing having an axial opening therethrough, and having a pair of diametrically aligned transverse openings therethrough intersecting the axial opening, and having a second pair of diametrically aligned transverse openings therethrough axially spaced from the first mentioned pair of openings and intersecting the axial opening, an arm member extending from the casing aligned with one of said first mentioned pair of diametrically aligned transverse openings and having an opening therethrough aligned with the said one of said first mentioned pair of diametrically aligned transverse openings in the casing and an arm member extending from the casing aligned with one of said second mentioned pair of diametrically aligned transverse openings and having an opening therethrough aligned with the said one of the second mentioned pair of diametrically aligned transverse openings in the casing, one of said arm members adapted to be connected to the coffee urn, the other arm member adapted to be connected to the cream container, a cream regulator bracket secured to the last mentioned arm member, said bracket having an axial opening and having a further opening therethrough perpendicular to said axial opening, a plug rotatably journalled in said perpendicular opening of the bracket, said plug having a single, centrally aligned transverse opening therethrough, in the plane of the axial opening of the bracket when the plug is journalled in the perpendicular opening of the bracket, so that, on turning the plug in the bracket, its transverse opening may be selectively moved into partial or full registry with the axial opening of the bracket or out of registry therewith, to thus regulate the flow of cream through the bracket arm member of the faucet casing to which the bracket is secured, an elongated valve stem proportioned to snugly, rotatably fit within the axial opening of the faucet casing, said valve stem having a vertical discharge opening therethrough and having axially spaced transverse openings intersecting the vertical opening and terminating circumferentially of the stem, the parts being so proportioned that said valve stem will snugly rotatably fit within the axial opening of the casing, and, when so disposed, have the transverse openings thereof aligned with said first and second pairs of diametrically aligned openings in the casing so that, on rotation of the stem in the faucet casing axial opening, the transverse openings of the stem may be selectively positioned in alignment with the arms of the faucet casing to be connected with the coffee urn and cream container, to thus mix coffee and cream in predetermined relative ratios to suit the individual taste.

2. In an assembly as set forth in claim 1, said vertical discharge opening of the valve stem for the faucet casing also terminating at the upper end of the stem, and means for closing the vertical discharge opening of the valve stem at the upper end of the stem, said means being friction means manually operable, and spring means engaging the lower end of the valve stem and lower end of the faucet casing for frictionally holding the valve stem assembled in the faucet casing.

3. In an assembly as set forth in claim 1, a plate in the faucet casing disposed thereabove angularly and indicia means on the plate disposed perpendicular to the top of the faucet casing and in horizontally spaced relation on the plate, oriented relative to the plane of the transverse opening through the plug to indicate the position thereof relative to the axial opening of the bracket on turning the plug in the bracket and thus to indicate the flow of cream through the plug and bracket.

4. In an assembly as set forth in claim 1, the transverse opening of the valve stem aligned with the faucet casing arm to be connected with the coffee urn on assembly of the stem in the faucet casing being elongated at the outer face of the valve stem circumferentially along the latter, to continue the registry of said opening with said arm while the other transverse opening of the valve stem is registered with or disaligned from the arm to be connected with the cream container to the degree determined by rotation of the valve stem.

5. In an assembly as set forth in claim 4, said elongated opening portion at the outer face of the valve stem being extended circumferentially along the latter equidistantly of the center of the transverse opening in each direction.

6. In an assembly as set forth in claim 1, friction means on the plug engaging the bracket for sealing the plug in the bracket, said friction means being manually operable.

7. In an assembly as set forth in claim 1, an arm member extending laterally from the casing in line with the other of the second mentioned pair of diametrically disposed transverse openings in the casing and having an aligned opening therethrough so that the cream regulator bracket may be so secured to the casing by being secured to either of said arm members so aligned with the second mentioned pair of openings of the faucet casing, and means for closing the arm member not connected with the cream container.

8. In an assembly as set forth in claim 1, arm members extending laterally from the casing in line with the others of the first and second mentioned pairs of diametrically aligned transverse openings in the casing, and having aligned openings therethrough so that the cream regulator bracket may be so secured to one of a pair of diametrically opposed arm members and the coffee urn connected to one of the other pair of diametrically opposed arm members.

9. In an assembly as set forth in claim 8, means for closing the arm members not connected with the coffee urn or cream regulator bracket.

References Cited in the file of this patent

UNITED STATES PATENTS

| | | |
|---|---|---|
| 667,891 | Neudecker | Feb. 12, 1901 |
| 1,508,056 | Jansen | Sept. 9, 1924 |
| 1,555,434 | Rockey | Sept. 29, 1925 |
| 2,680,455 | Raiteri | June 8, 1954 |